No. 620,999. Patented Mar. 14, 1899.
J. WAMBSGANS.
HINGE JOINT FOR ARTIFICIAL LIMBS.
(Application filed May 18, 1898.)
(No Model.)
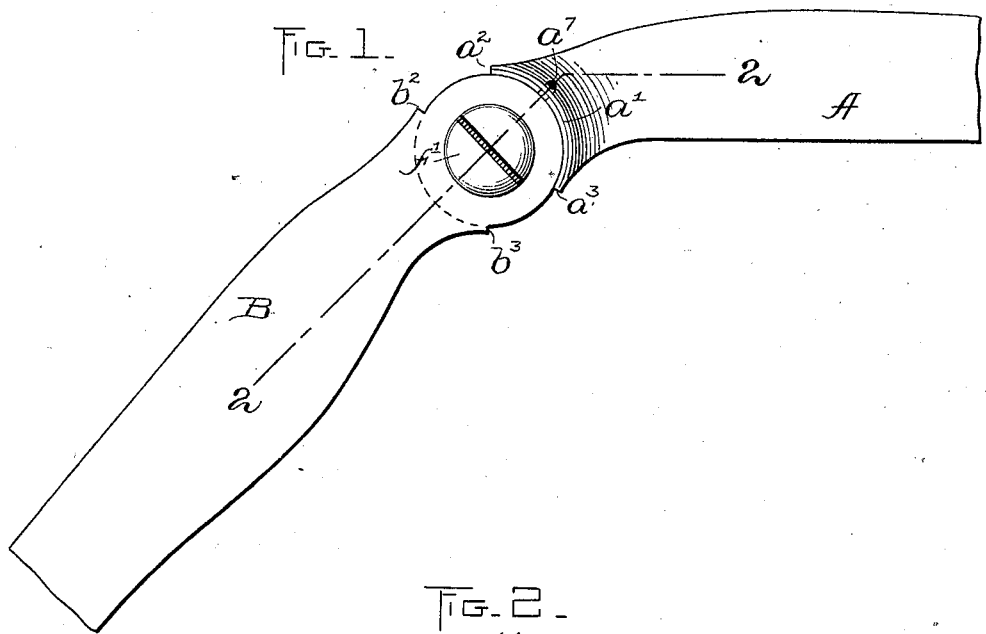
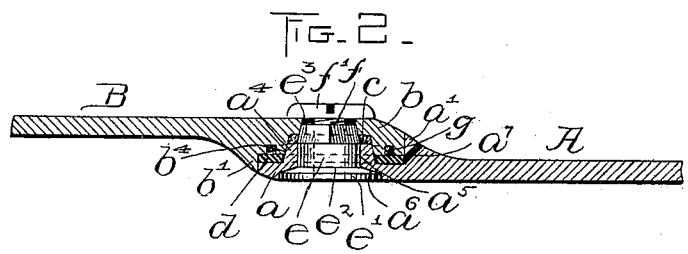
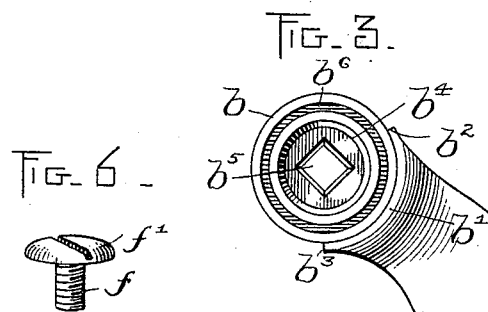
WITNESSES:
A. D. Harrison
P. W. Pezzette
INVENTOR:
Jacob Wambsgans
by Wright, Brown & Quinby
Attys.

UNITED STATES PATENT OFFICE.

JACOB WAMBSGANS, OF PEORIA, ILLINOIS.

HINGE-JOINT FOR ARTIFICIAL LIMBS.

SPECIFICATION forming part of Letters Patent No. 620,999, dated March 14, 1899.

Application filed May 18, 1898. Serial No. 681,017. (No model.)

*To all whom it may concern:*

Be it known that I, JACOB WAMBSGANS, of Peoria, in the county of Peoria and State of Illinois, have invented certain new and useful Improvements in Hinge-Joints for Artificial Limbs, of which the following is a specification.

This invention has relation to artificial limbs, and more particularly to joints for the same, having for its object to provide certain improvements in the last-named devices whereby they may be rendered more durable and whereby the action of the artificial limb may more nearly approach that of a natural limb than heretofore.

To further specify the objects of the invention, they are to provide a joint in which provision is made for the reception and retention of a suitable lubricant and to also provide for compensating for the wear of the parts, the said wear being by reason of the peculiar construction of the joints equally distributed.

To these ends the invention consists of a joint of the type specified possessing certain features of novelty, all as illustrated upon the drawings and now to be described in detail, and fully pointed out in the claim hereunto appended.

Reference is to be had to the accompanying drawings and to the letters marked thereon, the same letters designating the same parts or features, as the case may be, wherever they occur.

Of the drawings, Figure 1 represents in side elevation two leg irons or straps connected by my improved joint. Fig. 2 represents a longitudinal section through the same. Fig. 3 represents one of the irons or straps detached to illustrate the device for retaining a lubricant. Figs. 4 and 5 represent the soft-metal washer and the pintle.

Referring to the drawings, A indicates a strap or iron which constitutes one member of the joint, and B indicates the strap or iron constituting the other member. These two members may be of any desired length, width, or shape and may have suitable provisions for attachment to the two parts of the artificial limb.

The members A and B are formed with flattened rounded ends $a$ $b$ and flanges or lips $a'$ $b'$, the ends $a^2$ $a^3$ $b^2$ $b^3$ of which constitute stops. The flattened faces of the said disk-like ends oppose each other, and the ends $a^2$ $b^2$ and $a^3$ $b^3$ of the flanges or lips are separated a short distance to permit one of the members or irons to have a limited movement relatively to the other, the flange of one member extending upward and the flange of the other extending downward, as shown.

The member A is provided with a tapering or frusto-conical boss $a^4$, which projects part way into a tapering socket $b^4$ in the member B, and between the end of the boss and the bottom of the socket is placed a compressible felt washer $c$. A ring or washer $d$, of vulcanized fiber, is placed between the two faces of the ends $a$ $b$, encircling the boss $a^4$, as clearly illustrated upon the drawings. Extending through the said boss is a cylindrical aperture $a^5$, having a countersink $a^6$ to receive the cylindrical pintle $e$, with a head $e'$, beveled at $e^2$, the said head being flush with the end $a$. The end $e^3$ of the pintle is squared and extends into an aperture $b^5$ in the end $b$ of the member shaped to receive it. The end of the pintle does not project entirely through the two ends $a$ and $b$, but is a short distance below the outer face of the last-mentioned end, to allow for taking up wear, as clearly shown in Fig. 2, and it is encircled by the washer $c$. There is a threaded aperture in the end of the pintle to receive a screw $f$, with a large head $f'$, which overlaps the end of the pintle and the surrounding edges of the end of the iron B. This screw bearing upon the end $b$ with its head draws upon the pintle $e$ to draw the member A into contact with the member B. In the inner face of the end $b$ is a groove $b^6$, which encircles the aperture $b^4$ therein, and placed therein is a loosely-braided cord or wick $g$, which substantially fills it and is of a character to receive and return any suitable lubricant which may be forced through an oil-duct $a^7$, extending through the flange or lip $a'$.

From the description which I have herein given it will be seen that the joint possesses many features of advantage which have been lacking in joints previous to my invention. Attention is called to the large area of the contacting surfaces, whereby the wear is distributed equally to all of the parts and is not confined to two small parts. The beveling of the head and the tapering of the boss and the socket enable the user of the joint to overcome any looseness due to wear, and, moreover, insure the centering of the parts. The washer $d$ being relatively of soft material wears a little more rapidly than the other parts, which are of steel, and its wearing-surface has a large area, so that when the parts become at all loose they can be easily tightened by the screw. The pintle rotates or oscillates with the iron or member B.

By providing the joint with the two lubricant receiving and retaining devices—i. e., the washer and the wick in the groove—there is always a sufficient supply of oil to insure the parts working with a uniform easy motion. Thus a smooth free movement of the limbs without looseness of the parts is insured.

Having thus explained the nature of the invention and described a way of constructing and using the same, though without attempting to set forth all of the forms in which it may be made or all of the modes of its use, I declare that what I claim is—

A hinge-joint for artificial limbs, comprising a member having a tapering socket, and provided with a groove surrounding said socket, a member having a tapering boss extending part way into the said tapering socket, whereby the tapering or beveled walls only are in contact, a soft felt wearing-ring interposed between the end of the boss and the bottom of the socket, a washer surrounding the boss and lying between the said parts, a lubricant-retaining wick in the said groove in contact with the said washer, and a pintle for connecting the said members together, substantially as described.

In testimony whereof I have affixed my signature in presence of two witnesses.

JACOB WAMBSGANS.

Witnesses:
RUDOLPH G. JUNGST,
THEODORE B. WISSING.